United States Patent [19]

Kalfoglou

[11] 4,120,358

[45] * Oct. 17, 1978

[54] SURFACTANT OIL RECOVERY METHOD FOR USE IN HIGH TEMPERATURE FORMATIONS CONTAINING WATER HAVING HIGH SALINITY AND HARDNESS

[75] Inventor: George Kalfoglou, Houston, Tex.

[73] Assignee: Texaco Inc., New York, N.Y.

[*] Notice: The portion of the term of this patent subsequent to Apr. 12, 1994, has been disclaimed.

[21] Appl. No.: 786,165

[22] Filed: Apr. 11, 1977

Related U.S. Application Data

[63] Continuation-in-part of Ser. No. 643,965, Dec. 24, 1975, Pat. No. 4,016,932.

[51] Int. Cl.$^2$ .............................................. E21B 43/22
[52] U.S. Cl. ................................. 166/275; 252/8.55 D
[58] Field of Search ............... 166/273, 274, 275, 303, 166/272; 252/8.55 D, DIG. 1

[56] References Cited

U.S. PATENT DOCUMENTS

| | | | |
|---|---|---|---|
| 1,970,578 | 8/1934 | Schoeller et al. | 260/458 |
| 2,226,119 | 12/1940 | DeGroote et al. | 252/8.55 |
| 3,811,504 | 5/1974 | Flournoy et al. | 252/8.55 X |
| 3,811,505 | 5/1974 | Flournoy et al. | 166/274 |
| 3,827,497 | 8/1974 | Dycus et al. | 252/8.55 X |
| 3,858,656 | 1/1975 | Flournoy et al. | 166/274 |
| 4,016,932 | 4/1977 | Kalfoglou | 166/303 |

OTHER PUBLICATIONS

Schick, Nonionic Surfactants, vol. 1, pub. 1967 by Marcel Dekker, Inc., New York, pp. 187, 188 and 197–199.

*Primary Examiner*—Herbert B. Guynn
*Attorney, Agent, or Firm*—Carl G. Ries; Thomas H. Whaley; Jack H. Park

[57] ABSTRACT

Disclosed is a surfactant fluid employing two or more surfactants, one anionic and one or more non-ionic surfactant containing two or more polyethoxy chains such as dipolyethoxylated alkylcatechols or dipolyethoxylated primary alkylamines and a process using the fluid for recovering oil from formations which also contain water having high salinities, e.g., salinities greater than about 40,000 parts per million, and which may include high concentrations of divalent ions such as calcium and/or magnesium, e.g., greater than about 3,000 parts per million calcium and magnesium. Nonionic surfactants having two or more polyethoxy chains have substantially higher cloud points than corresponding nonionic surfactants with similar oil soluble groups and the same number of ethoxy groups in a single chain. Superior results are obtained if the nonionic surfactant is chosen to have a cloud point from 20° F to 80° F above the formation temperature.

7 Claims, 5 Drawing Figures

EFFECT OF TEMPERATURE ON CAPILLARY DISPLACEMENT OF CRUDE OIL

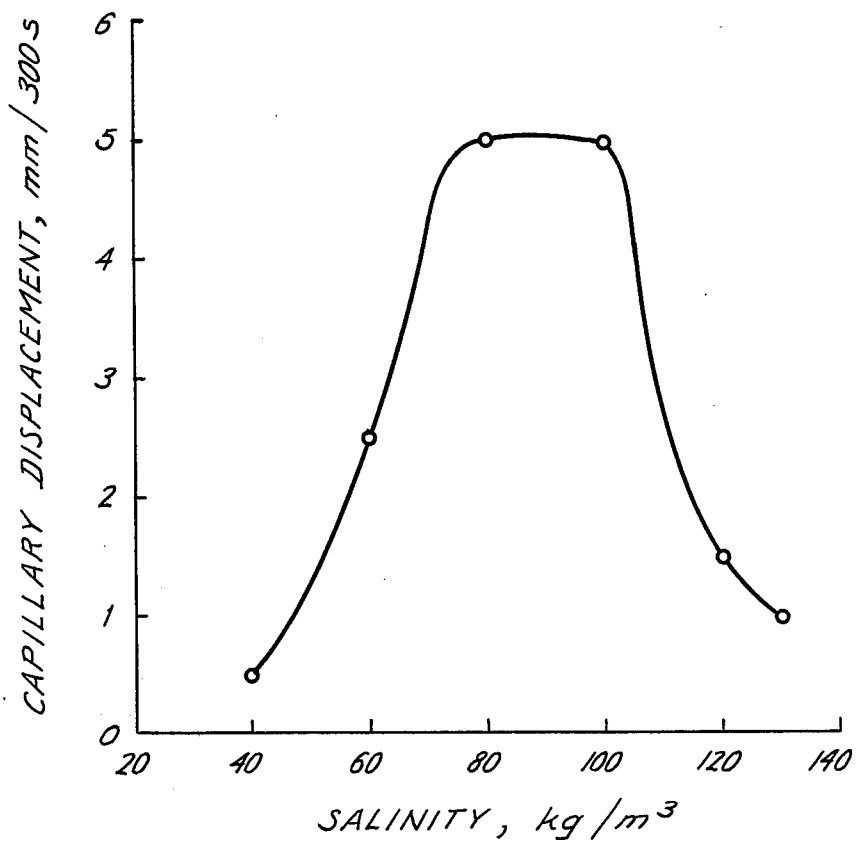

SURFACTANT OIL RECOVERY METHOD FOR USE IN HIGH TEMPERATURE FORMATIONS CONTAINING WATER HAVING HIGH SALINITY AND HARDNESS

CROSS REFERENCE TO RELATED APPLICATIONS

This is a continuation-in-part of copending application Ser. No. 643,965 filed Dec. 24, 1975, now U.S. Pat. No. 4,016,932 for "Surfactant Oil Recovery Method For Use In High Temperature Formations Containing Water Having High Salinity and Hardness".

BACKGROUND OF THE INVENTION

This invention relates to a surfactant fluid and to an oil recovery process employing the fluid which contains two or more surfactants, at least one of which is a nonionic surfactant having two or more polyethoxy chains. More particularly, this invention concerns an oil recovery process suitable for use in oil formations containing water having high salinity and hardness and which additionally may be hotter than about 80° F., which avoids phase instability of the surfactant fluid in the higher temperature environment.

Field of the Invention

Petroleum is found in subterranean formations or reservoirs in which it has accumulated, and recovery is initially accomplished by pumping or permitting the petroleum to flow to the surface of the earth through wells drilled into and in fluid communication with the subterranean formations. Petroleum can be recovered from subterranean formations only if certain conditions exist. There must be an adequately high concentration of petroleum in the formation, and there must be adequate permeability or interconnected flow channels throughout the formation to permit the flow of fluids therethrough if sufficient pressure is applied to the fluid. When the subterranean petroleum-containing formation has natural energy present in the form of an underlying active water drive, solution gas, or a high pressure gas cap above the petroleum within the formation, this natural energy is utilized to recover petroleum. In the primary phase of petroleum recovery, petroleum flows to wells drilled in the formation, which petroleum is displaced toward the wells by this natural energy. When the natural energy source is depleted or in the instance of those formations which do not originally contain sufficient natural energy to permit primary recovery operations, some form of supplemental recovery process must be applied to the reservoir. Supplemental recovery is frequently referred to as secondary recovery, although in fact it may be primary, secondary or tertiary in sequence of employment.

Petroleum recovery operations involving the injection of water into the formation for the purpose of displacing petroleum toward the production wells, commonly referred to as waterflooding, is the most economical and widely practiced form of supplemental recovery. Water does not displace petroleum with high efficiency, however, since water and oil are immiscible and the interfacial tension between water and oil is quite high. Persons skilled in the art of oil recovery have recognized this weakness of water flooding and many additives have been described in the prior art for decreasing the interfacial tension between the injection water and the formation petroleum. Petroleum sulfonates have been disclosed in many references for use in oil recovery operations, but petroleum sulfonates have limitations with respect to formation water salinity, hardness, and other factors which frequently restrict their usefulness. U.S. Pat. No. 3,811,504 describes a three-component surfactant system comprising an anionic surfactant such as an alkyl or alkylaryl sulfonate plus a non-ionic surfactant such as a polyethoxylated alkyl phenol plus an alkylpolyethoxy sulfate. U.S. Pat. No. 3,811,505 describes a dual surfactant system employing an anionic surfactant such as alkyl or alkylaryl sulfonate, or phosphate, plus a nonionic surfactant such as polyethoxylated alkyl phenol or polyethoxylated aliphatic alcohol. U.S. Pat. No. 3,811,507 describes an oil recovery method using a dual surfactant system comprising an anionic surfactant such as a linear alkyl or a linear alkylaryl sulfonate, plus a sulfated polyethoxylated aliphatic alcohol. These systems permit the use of surfactant flooding processes in formations containing from 500 to 12,000 parts per million polyvalent ions such as calcium and magnesium.

While the foregoing multicomponent surfactant systems are effective for many applications, there are problems in the use of certain systems containing polyethoxylated hydrocarbon nonionic surfactants in subsurface petroleum formations whose temperatures exceed a value greater than about 100° F. It is known that the polyethoxylated nonionic surfactants have specific cloud points, or temperatures above which they are relatively insoluble, and it is believed that the problems experienced in the use of such nonionic surfactants in high temperature formations, which are manifest in phase separation phenomena, are associated with the cloud point of the nonionic surfactants. It is known in the art that the cloud point of polyethoxylated alkyl phenols, for example, increases with the degree of ethoxylation, i.e., with the average number of ethoxy groups associated with the molecule. It is also known that the cloud point decreases as the salinity of the surfactant solution increases. For example, an ethoxylated nonyl phenol having ten ethoxy groups per molecule will have a cloud point of about 138° F. in essentially pure water, and the cloud point will be reduced to about 94° F. in a ten percent sodium chloride brine solution. It is further known that the maximum detergency using an aqueous solution of a polyethoxylated alkyl phenol occurs at the cloud point of the particular ethoxylate. See, for example, "Nonionic Surfactants" by Ed Martin, J. Schick, published by Marcel Decker Inc., New York 1967. It is not taught in the literature, however, how the cloud point of an ethoxylated nonionic surfactant, when used in combination with one or more other surfactants in an oil recovery process being applied to a formation containing high quantities of divalent ions such as calcium and/or magnesium as well as high salinities, affects the surfactant action.

The temperature of many oil formations is so high that surfactant systems employing conventional nonionic surfactants containing single polyethoxy chains such as polyethoxylated alkylphenols cannot be used.

In view of the foregoing discussion, it can be readily appreciated that there is a substantial commercial need at the present time for an oil recovery method which can be applied to formations containing high salinity and hard water, which formations have a temperature greater than 100° F., e.g., from about 100° to about 180° F. or more (37.8° C. to 82° C.).

SUMMARY OF THE INVENTION

I have discovered that surfactant systems containing two or more surfactants, at least one of which is a non-ionic surfactant containing two or more ethoxy chains, such as a dipolyethoxylated primary aliphatic or alkylaryl amine or a dipolyethoxylated alkylcatechol or alkyl alcohol may be employed in subterranean, petroleum-containing formations for the purpose of recovering petroleum therefrom, which formations additionally contain water having high salinity and high concentrations of polyvalent ions such as calcium or magnesium, the temperature of the formations also being from about 100° F. to about 180° F. The cloud points of a number of dipolyethoxylated surfactants are determined in aqueous solutions containing about the same salinity and about the same concentration of divalent ions such as calcium and/or magnesium as is present in the water contained in the formation to which the process is to be applied. A dipolyethoxylated non-ionic surfactant having a cloud point from 20° F. to 80° F. above the formation temperature is selected, and an aqueous solution containing this non-ionic surfactant together with the desired primary anionic surfactant such as a petroleum sulfonate, or an alkyl or alkylaryl sulfonate, the surfactant fluid also containing about the same salinity and concentration of polyvalent ions as the formation water, is injected into the formation.

The dipolyethoxylated nonionic surfactants exhibit significantly higher cloud points than nonionic surfactants having only a single ethoxy chains, and so can be used in higher temperature formation. Substantially fewer total ethoxy groups are required for a dipolyethoxylated surfactant than for a single polyethoxy chain nonionic surfactant having about the same oil soluble group and about the same cloud point.

BRIEF DESCRIPTION OF THE DRAWINGS

FIG. 5 illustrates the effect of varying the salinity on capillary displacement using a dual surfactant system comprising 1.0% alkylbenzene sulfonate and 0.8% dipolyethoxylated fatty amine at 77° F. (25° C.).

DESCRIPTION OF THE PREFERRED EMBODIMENTS

Figure 1:
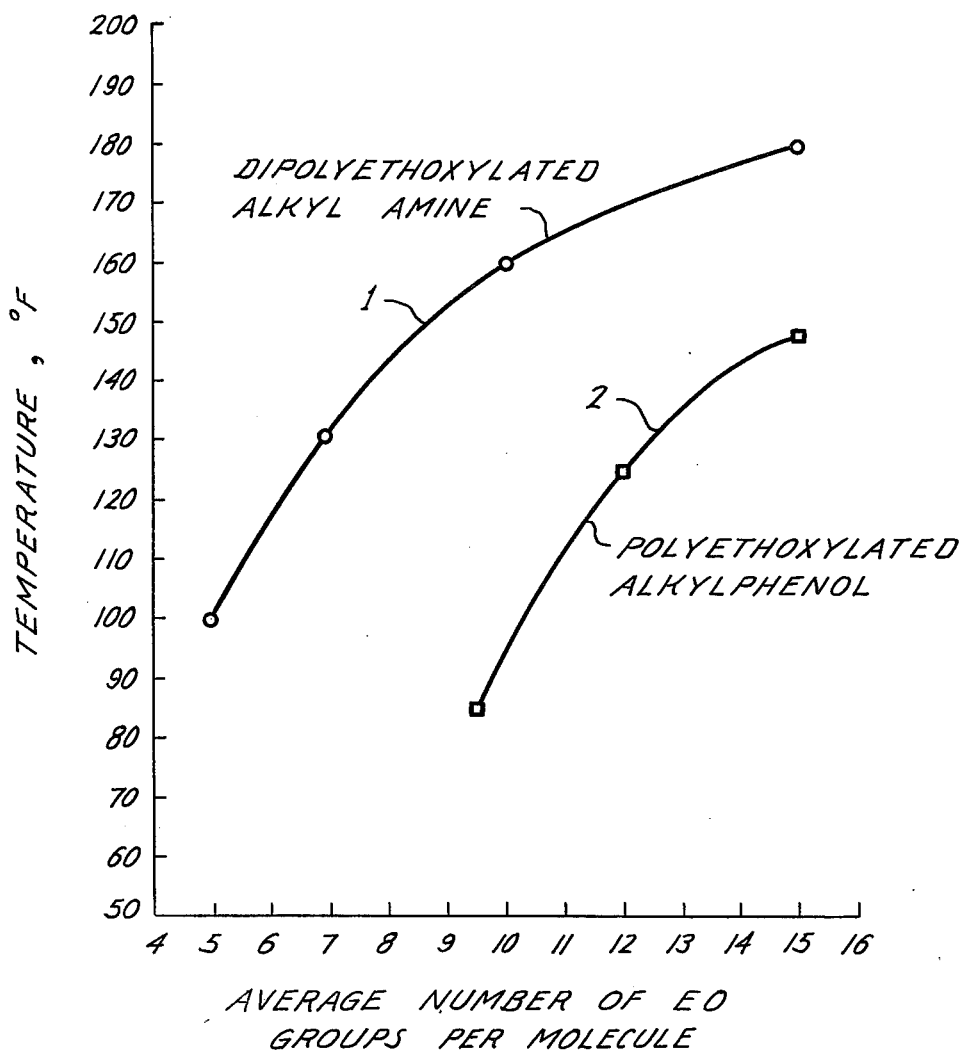
FIG. 1 illustrates the variation in cloud points of a series of ethoxylated alkyl phenols differing only in the degree of ethoxylation and of a series of dipolyethoxylated fatty amines, in 10% sodium chloride brine.

This invention concerns a surfactant oil recovery method applicable to subterranean petroleum-containing formations having relatively high salinity water, e.g., water containing from about 40,000 to about 140,000 parts per million total dissolved solids, which may also have dissolved therein from 3,000 to 12,000 parts per million polyvalent ions such as calcium or magnesium, the formation temperature being from about 80° to 180° F. or higher.

I have found that nonionic surfactants having two polyethoxy chains rather than a single, long polyethoxy chain have several substantial unexpected advantages for use as a solubilizing co-surfactant in combination with a primary anionic surfactant such as a petroleum sulfonate, an aliphatic sulfonate or an alkylaryl sulfonate. The dipolyethoxylated nonionic surfactants have higher cloud points than single ethoxy chain nonionic surfactants, and so can be used in higher temperature formations. The dipolyethoxylated nonionics require less ethylene oxide to be effective as a nonionic surfactant than do the single chain materials. Moreover, the dipolyethoxylated surfactants are operable over a broader temperature range than are single chain nonionic surfactants, and can be used in applications where there is a substantital difference between surface ambient temperatures and formation temperatures without the need for heating the surfactant fluid as is often required in the use of single ethoxy chain nonionic surfactants, which lose effectiveness at temperature substantially below their cloud points. The total degree of ethoxylation, e.g., the average total number of ethoxy groups attached to the dipolyethoxylated nonionic surfactant which is used as a solubilizing co-surfactant with the anionic primary surfactant as petroleum sulfonate, alkyl sulfonate, or an alkylaryl sulfonate, is very critical. In high salinity, hard water formations, it is necessary to adjust the degree of ethoxylation precisely based on tests performed at the formation temperature using an aqueous solution whose salinity and polyvalent ion concentration very nearly matches the salinity and polyvalent ion concentration of the formation water in which the surfactant flood is to be performed.

The surfactant system itself will ordinarily comprise at least two components which are described below.

(1) An anionic surfactant which will ordinarily be an organic sulfonate such as a petroleum sulfonate having an average equivalent weight from about 300 to about 450, or a synthetic sulfonate having the following general formula:

$$[R-SO_3]^- Y^+$$

where R is an alkyl group containing from 8 to 25 carbon atoms, or an alkylaryl radical, linear or branched, having from 5 to 25 carbon atoms and preferably from 8 to 20 carbon atoms on the alkyl chain, and Y is a monovalent cation such as sodium, potassium, lithium, or ammonium.

(2) A nonionic surfactant having two or more ethoxy chains, and having one of the following two structures:

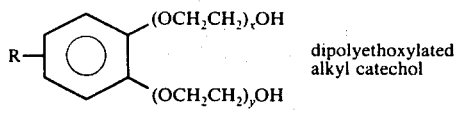

dipolyethoxylated alkyl catechol wherein R is an aliphatic group such as an alkyl radical, linear or branched, $x$ is a number from 1 to 12, and preferably from 3 to 8, $y$ is a number from 1 to 12, and preferably from 3 to 8, and the sum of $x$ and $y$ is from 2 to 24, and preferably from 6 to 16 or:

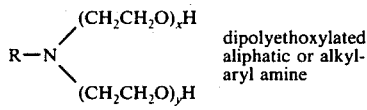

dipolyethoxylated aliphatic or alkyl-aryl amine wherein R is an aliphatic group such as an alkyl radical, linear or branched, or an alkylaryl radical such as alkylbenzene or alkyltoluene, having from 6 to 25, and preferably from 8 to 20 carbon atoms in the aliphatic or alkyl chain.

$x$ and $y$ are from 1 to 12, and preferably from 3 to 8, and the sum of $x$ and $y$ is from 2 to 24, and preferably from 6 to 16.

In the foregoing discussion, the polyethoxy chains of the dipolyethoxylated nonionic surfactant may be composed of a mixture of ethoxy and higher molecular weight alkoxy groups such as propoxy with relatively more ethoxy than higher alkoxy in order to ensure maintaining an overall hydrophilic characteristic.

A third general type of surfactant is sometimes utilized, in addition to the above-identified two types of surfactants, and is especially useful in applications to formations containing especially high salinity water, e.g., from 80,000 to 160,000 parts per million total dissolved solids. This additional type is an alkyl or alkylarylpolyethoxy sulfonate or sulfate. The remainder of the disclosure will be restricted to the simpler, two-component system comprising an anionic surfactant such as petroleum sulfonate or an alkylaryl sulfonate, plus a dipolyethoxylated nonionic surfactant such as a dipolyethoxylated aliphatic amine or dipolyethoxylated alkyl catechol.

It is well known that when a two-component system is utilized, in order to tailor the surfactant performance to the salinity and hardness of the formation water, the concentration of each of the materials is quite critical and extensive laboratory tests should be performed in order to design an optimum surfactant composition for any particular application. Generally, the concentration of each of the surfactant components used in the fluid and process of my invention will be from about 0.05 percent to about 5 percent and preferably from about 0.2 percent to about 2 percent by weight of each of the materials. Ordinarily, the ratio of the primary anionic surfactant to the dipolyethoxylated nonionic surfactant is inversely related to the salinity and total hardness of the aqueous solution in which it is to be utilized. Although the best results will always be obtained when the exact ratio is identified by actual experimentation, the following general rule of thumb will suffice as a preliminary estimate in order to arrive at ratios for initial experimentation. If the formation water total salinity is from 40,000 to 100,000 parts per million total dissolved solids, and/or the hardness is from about 3,000 to about 6,000 parts per million, the weight ratio of anionic to nonionic surfactant should be between about 3:1 to about 1:1. For formation water having a salinity of from 60,000 to 140,000 parts per million total dissolved solids, and/or total hardness in the range of from about 5,000 to about 12,000 parts per million, the ratio of anionic to nonionic surfactant can be between about 2:1 to about 1:3.

The molecular characteristics of the surfactants used is similarly an important factor. For example, the equivalent weight of the petroleum sulfonate or other hydrocarbon sulfonate and the number of carbon atoms and ethoxy groups in the dipolyethoxylated nonionic surfactant all affect the performance of a multi-component surfactant in any particular crude oil and formation water salinity, hardness and temperature values.

One of the preferred dipolyethoxylated nonionic surfactants for use in the fluid and process of my invention is a dipolyethoxylated aliphatic or alkylaryl amine. While alkylamine surfactants are ordinarily cationic in nature, they acquire increasingly nonionic characteristics as the number of ethylene oxide units attached to the amine molecule is increased.

Dipolyethoxylated alkylamines may be prepared directly by reacting a primary amine with ethylene oxide as follows:

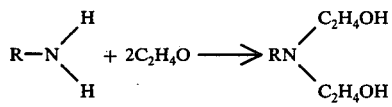

Both reactive hydrogens of the amine group are substituted before any polyoxyethylation occurs. Polyoxyethylation may be accomplished using basic catalyst such as sodium or potassium hydroxide at 150° C. or higher.

Commercially available dipolyethoxy fatty amines include these in which the aliphatic group is based on fatty acids such as coco oil, stearyl, oleyl, soya or tallow. These fatty acids are generally comprised of a mixture of compounds of differing carbon chain length such as, for example, coco oil and tallow oil which have the following fatty acid composition.

TABLE I

| Coco Oil Composition | |
|---|---|
| Carbon Chain Length | % |
| $C_8$ | 8 |
| $C_{10}$ | 7 |
| $C_{12}$ | 50 |
| $C_{14}$ | 16 |
| $C_{16}$ | 9 |
| $C_{18}$ (Saturated) | 5 |
| $C_{18}$ (Unsaturated) | 5 |

TABLE II

| Tallow Composition | |
|---|---|
| Carbon Chain Length | % |
| $C_{14}$ | 5 |
| $C_{16}$ | 30 |
| $C_{18}$ (Saturated) | 20 |
| $C_{18}$ (Unsaturated) | 45 |

The commercial synthesis of dipolyethoxylated fatty amines is accomplished by first converting the fatty acids to nitrile by catalytic reaction with ammonia in liquid or vapor phase at about 300° C. using catalysts such as thiourea, alumina, titania, silica gel, or manganese oxide. The nitriles are then converted to primary amines by catalytic reduction using Raney nickel or other catalysts at 100° C. to 150° C.

Dipolyethoxylated fatty amines are commercially available under the trademark Ethomeen ® from Armour Industrial Chemical Co. and Varonic ® from Ashland Chemical Co.

The lower ethylene oxide containing dipolyethoxylated fatty amines are primarily cationic whereas the higher ethylene oxide adducts are mainly nonionic in character. The particular dipolyethoxylated fatty amines for use in the fluid and process of my invention have at least 6 moles of ethylene oxide and so exhibit exclusively functional characteristics of nonionic surfactant.

The dipolyethoxylated aliphatic amines most suitable for use in the fluid and process of my invention are those in which the average total number of ethylene oxide units in the two chains is from 2 to 24 and preferably from 6 to 16. There will always be a mixture of molecular species present in the material used, differing in the number of carbon atoms present in the aliphatic chain, the total number of ethylene oxide units per molecule, and the distribution of ethylene oxide units present in each of the two chains. For example, a dipolyethoxylated alkylamine having 16 carbon atoms and an average total number of ethylene oxide units per molecule of eight may include species having from 12 to 18 carbon atoms, from six to ten ethylene oxide units, and the distribution of ethylene oxide units between the two polyethoxy chains can vary considerably, even for samples having relatively uniform total numbers of ethylene oxide.

In the practice of the process of my invention, the formation into which the surfactant solution will be injected will ordinarily have been subjected to water flooding. Although this is not a necessary first step for the proper functioning for the process of my invention, water flooding will usually be practiced in a field if any substantial amount of additional oil can be recovered from the formation by application of water flooding.

Surfactant flooding is often not begun until after water flooding has continued until the water-oil ratio at the producing wells rises to such a high value that further production of petroleum from the well is impossible or economically unattractive. Ideally, injection of surfactant should be initiated before the water-oil ratio rises to a value such that further commercial production is unattractive, so as to avoid a long period of time before further additional oil production is accomplished since there is necessarily a long lag time between the initiation of surfactant fluid injection and the observation of improved stimulation from the production well.

If it is known or determined by experimentation that adsorption of surfactant will be a substantial problem, it is generally preferable to inject into the formation prior to the injection thereinto of the aqueous surfactant fluid, and aqueous solution of a material which is strongly adsorbed by the formation to serve as a sacrificial adsorption agent. When the substance is adsorbed from solution, the adsorption capacity of the formation rock is satisfied and subsequent fluids injected into the formation will be less strongly adsorbed by the formation rock. Suitable materials for use as a sacrificial adsorption agent include water soluble carbonates, halogens, especially fluorides, phosphate, polyphosphate wetting agents, and lignosulfonates. In formations containing high concentrations of divalent ions such as calcium and/or magnesium, care should be exercised in choosing the sacrificial agent so as to avoid the precipitation of the material upon contacting the divalent ions in the formation, which can at least reduce the effectiveness of the material for preventing surfactant adsorption, and which may lead to plugging of minor flow channels in the formation which can ultimately seriously reduce oil recovery efficiency.

In the practice of my invention, an aqueous solution which represents from about two to about 100 pore volume percent of a surfactant solution described herein is injected into the formation. Generally, the surfactant solution will also have a salinity about equal to the salinity of formation water, since the surfactant will have been tailored so as to provide maximum oil recovery efficiency at the salinity existing in the formation. Additionally, the concentration of polyvalent ions, such as calcium and/or magnesium, should similarly match the concentration thereof in the formation water. Furthermore, there is sometimes observed a minimum concentration of polyvalent ions in order to avoid phase separation of the surfactant fluids in high temperature formations, which can only be identified by experimentation.

It is generally good practice to inject into the formation after completion of injecting the surfactant solution an aqueous fluid containing a viscosity-increasing additive. Hydrophilic polymers such as polyacrylamides and polysacchardies are especially effective for this purpose. Ordinarily from about 100 to about 2,000 parts per million of a hydrophilic polymer is sufficient to increase the viscosity of the fluid injected after the surfactant solution to achieve the desired efficient displacement of the surfactant fluid and the formation petroleum displaced thereby. This viscous fluid injection is commonly referred to in the literature as a mobility buffer, since the purpose of injecting the viscous solution is the improvement of the mobility ratio between the displaced fluid and the displacing fluid.

Once the surfactants to be used in the process of my invention have been generally identified, the formation temperature should be determined in order to determine the optimum degree of ethoxylation of the dipolyethoxylated nonionic surfactant to be employed as a co-surfactant with the chosen primary anionic surfactant. The total degree of ethoxylation of the dipolyethoxylated nonionic surfactant should be selected so that its cloud point in a fluid which is essentially identical to the formation water in salinity and concentration of polyvalent ions, is somewhat greater than the average formation temperature. Specifically, the cloud point should be from 20° F. to 80° F. above the formation temperature.

Ordinarily the cloud point of dipolyethoxylated alkylamines or catechol increases with the degree of ethoxylation. As an example, the cloud point of a series of dipolyethoxylated fatty amines in 10 percent sodium chlordie brine, ranges from about 100° F. (38° C.) for a compound having an average of 5.0 total ethoxy groups per molecule to about 180° F. (82.2° C.) for a dipolyethoxylated fatty amine having 15 total ethoxy groups per molecule. The cloud point is decreased with increasing salinity of the fluid in which the dipolyethoxylated amine is dissolved. The cloud point of dipolyethoxylated amines or catechols must be determined in an aqueous solution having a salinity about equal to the salinity of the formation water.

The cloud points of dipolyethoxylated amines and dipolyethoxylated alkyl alcohols or alkylcatechols increase with the degree of ethoxylation; however, the dipolyethoxylated amines and catechols exhibit somewhat higher cloud points than polyethoxylated alcohols, phenols or thiols having similar numbers of carbon atoms and ethoxy groups. It should also be remembered that while raising the average total number of ethoxy groups per molecule increases the cloud point of dipolyethoxylated amines and catechols the surfactant's solubility in water is also increased as a consequence of increasing the total degree of ethoxylation. Dual surfactant systems designed to operate in specific formation water exhibit optimum performance when the surfactants are on the threshold of solubility, or slightly soluble in both water and oil. If the water solubility of one of the surfactants is increased significantly, (as by increasing the degree of ethoxylation to increase the cloud point of the surfactant) without making other adjustments, the effectiveness of the surfactant system is diminished. Slight increases in degree of ethoxylation can be tolerated; however, if the formation temperature is significantly greater than the cloud point of the surfactant system being considered, e.g., 10° F. or more, care must be exercised in increasing the degree of ethoxylation to adjust the cloud point according to my invention. If greater increases in degree of ethoxylation is necessary, the chain length of the hydrophobic portion of the dipolyethoxylated fatty amine must also be increased.

EXPERIMENTAL SECTION

In order to evaluate the effectiveness of the present method and to determine the degree of improvement in oil recovery efficiency resulting therefrom, the following experimental laboratory work was performed.

A series of tests were performed to measure the temperature stability or cloud points of various dipolyethoxylated fatty amines in a 10% (100,000 parts per million) sodium chloride solution, and the results are given in FIG. 1. Four samples of dipolyethoxylated fatty amines were used, having average total numbers of ethoxy groups per molecule of 5.0, 7.0, 10.0 and 15.0. The cloud points of a series of polyethoxylated alkyl phenols having from 9 to 15 ethoxy groups per molecule were also measured in the same 10% sodium chloride solution.

The dipolyethoxylated fatty amines were from the Varonic K ® series of dipolyethoxylated coco amines manufactured by Ashland Chemical Co. The polyethoxylated alkylphenols used were Surfonic N-95 ® and N-150 ® polyethoxylated nonyl phenols manufactured by Jefferson Chemical Company.

Curve 1 of FIG. 1 demonstrates the change in cloud point values (measured in 10% sodium chloride brine) of a series of dipolyethoxylated fatty amines with the same oil soluble group and increasing total numbers of ethoxy groups. It can be seen that the cloud point varies from about 100° F. (37.8° C.) for the 5.0 ethoxy group per molecule sample to about 180° F. (82.2° C.) for the sample containing a total of 15 ethoxy groups per molecule. Curve 2 shows the same series of measurements for a polyethoxylated nonyl phenol performed in a 10 percent sodium chloride brine. It can be seen that the cloud point for the dipolyethoxylated fatty amine is from about 33° F. to 90° F. higher in 10 percent brine solution than a polyethoxylated nonyl phenol.

This temperature advantage of the dipolyethoxylated nonionics over the single chain nonionic surfactants is considered extremely important since there are many oil formations in which the dipolyethoxylated fatty amine can be used and the ethoxylated alkyl phenol cannot, because the formation temperature exceeds the cloud point of the ethoxylated alkyl phenol, but does not exceed the cloud point of a dipolyethoxylated amine. Moreover, throughout the entire range investigated, the dipolyethoxylated fatty amine requires substantially fewer total moles of ethylene oxide per mole of surfactant to achieve a particular cloud point than does the polyethoxylated alkylphenol. For example, for a cloud point of 130° F. (54.4° C.), nonylphenol requires an average of 12.5 moles of ethylene oxide per mole of surfactant whereas a total of only seven moles of ethylene oxide are required per mole of fatty amine to result in the same cloud point.

Figure 3:
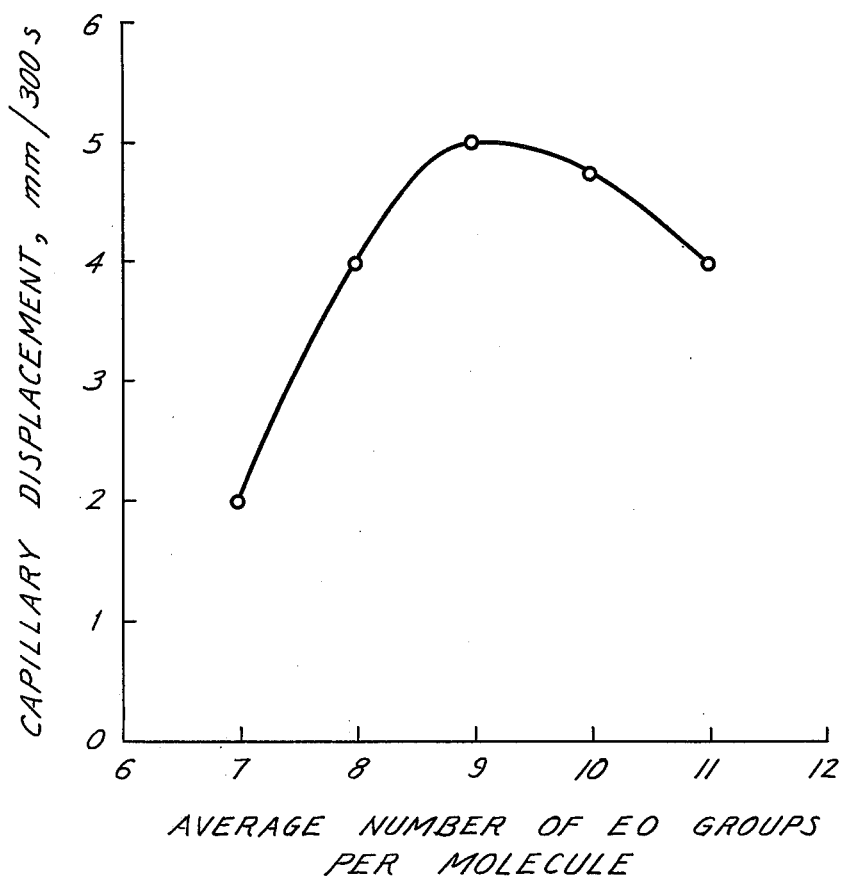
FIG. 3 illustrates the capillary displacement for a series of runs performed using a mixture of an alkylbenzene sulfonate anionic surfactant and an dipolyethoxylated fatty amine in a field brine having a salinity of 75,000 parts per million total dissolved solids with the average number of ethoxy groups being varied from 7 to 11.
Figure 4:
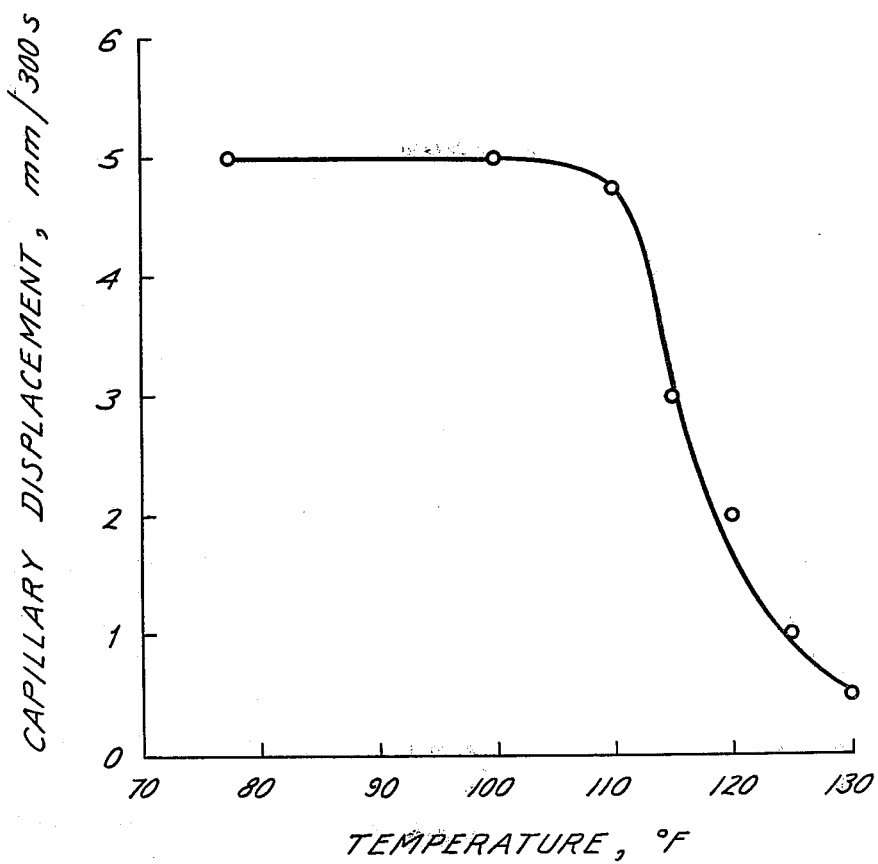
FIG. 4 depicts the variation in capillary displacement in a dual system consisting of an alkylbenzene sulfonate and a dipolyethoxylated fatty amine in a field brine having a salinity of 75,000 parts per million total dissolved solids, with the temperature varied from 70° F. to 130° F.

A second series of experiments were performed in which the capillary displacement was measured in an aqueous solution containing Varonic K209 ®, a dipolyethoxylated fatty amine mixed with Sulframin 1240 ®, an alkylbenzene sulfonate sold by Witco Chemical Company. The salinity of the test solution was 75,000 parts per million total dissolved solids including 8,000 parts per million divalent ions, mainly calcium and magnesium. Capillary displacement tests provide a convenient method for determining the optimum concentration of surfactants and the optimum salinity and hardness ranges for the systems being evaluated. The tests are performed by filling a number of closed end capillary tubes with the particular crude oil being studied and submerging the capillary tubes horizontally in the desired aqueous test solution. The aqueous phase of each of the tests will be comprised of the indicated salinity brine plus the surfactant mixture being evaluated. In each instance in which any displacement of oil by the aqueous phase occurred, an oilwater meniscus is formed. The only force tending to displace oil from the capillary tube is the force resulting from the difference in specific gravities of the two fluids. The force is offset by the interfacial tension between oil and the formation water, and it was observed that essentially no displacement occurred in the instance of brine having no surfactant added thereto, or in tests in which surfactants were ineffective for oil displacement purposes. When the surfactant composition succeeded in causing a movement of the meniscus, the distance travelled by the meniscus in millimeters in a five minute exposure period in the chemical system is recorded, and this is the displacement value that is plotted in FIGS. 2, 3 and 4. The maximum value of capillary displacements generally corresponds to the maximum reduction in interfacial tension between the oil and the field water, which corresponds to optimum petroleum recovery conditions.

Figure 2:
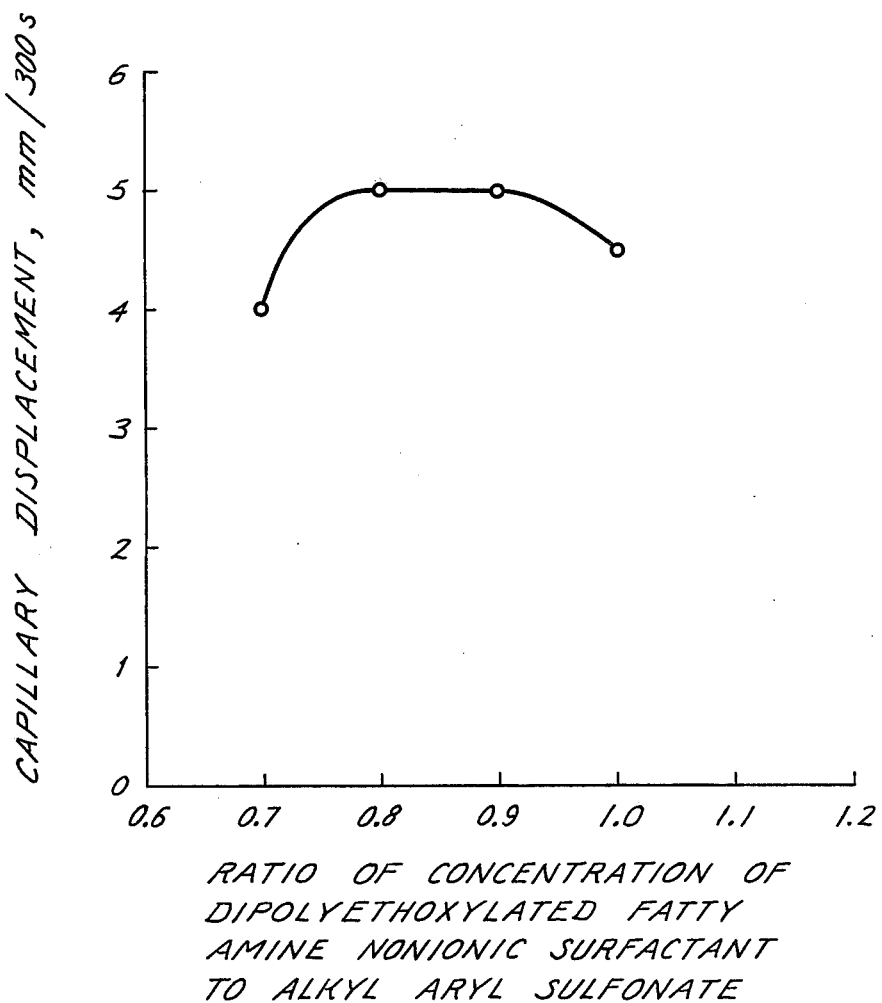
FIG. 2 illustrates the capillary displacement of crude oil in a field brine having a salinity of 75,000 parts per million total dissolved solids, using a dual surfactant system comprising an alkylbenzene sulfonate and a dipolyethoxylated fatty amine with the concentration ratio of the nonionic surfactant to the alkylbenzene sulfonate varied from 0.7 to 1.0.

The capillary displacement measurements plotted in FIG. 2 were made employing a dual surfactant system comprising 1.0 percent Sulframin 1240 ®, a linear alkylbenzene sulfonate, and from 0.7 to 1.0 percent of Varonic K209 ®, a dipolyethoxylated fatty amine with an average total number of ethoxy groups of 9. These tests were performed at 77° F. (25° C.). It can be seen that the maximum capillary displacement occurs when the ratio of dipolyethoxylated fatty acid to the alkylbenzene sulfonate is from 0.8 to 0.9.

I have found that the maximum oil recovery in the use of dipolyethoxylated surfactants in combination with organic sulfonates is achieved using a dipolyethoxylated fatty amine, for example, having a cloud point which is from about 20.0° F. to about 80° F. above the formation temperature. Dual surfactant systems using dipolyethoxylated aliphatic amines having somewhat higher ethoxylation numbers or somewhat lower ethoxylation numbers than the optimum value will result in a lower capillary displacement and in a correspondingly lower oil recovery effectiveness.

Another series of capillary displacement tests were performed utilizing a mixture of dipolyethoxylated fatty amine and an alkylbenzene sulfonate with the average total number of moles of ethylene oxide in the dipolyethoxylated fatty amine varied from 7.0 to 11.0. The tests were conducted at 78° F. in a 75,000 ppm salinity solution. In all tests, the concentration of dipolyethoxylated fatty amine was 0.8% and the concentration of alkylbenzene sulfonate was 1.0%. It can be seen that for this particular salinity, the optimum average number of moles of ethylene oxide is about 9.0.

In another series of experiments, capillary displacements were determined using a surfactant system consisting of 1.0% Sulframin 1240 ®, an alkylbenzene sulfonate, and 0.8% Varonic K-209 ®, a dipolyethoxylated fatty amine. The salinity of the aqueous surfactant test fluid was 75,000 parts per million total dissolved solids. The tests were performed at temperatures in the range of 80° F. (26.7° C.) to 130° F. (54.4° C.). It can be seen from the results shown in FIG. 4 that good capillary displacement results are obtained over the relatively broad range of 80° F. (26.7° C.) to about 120° F. (49° C.).

In FIG. 5 there is shown the results of another series of tests, in which the capillary displacements are determined at 77° F. (25° C.) using 1.0% Sulframin 1240 ® alkylbenzene sulfonate and 0.8% Varonic K-209 ®, a dipolyethoxylated fatty amine, with the salinity varied from 40,000 parts per million (40 Kg/m³) total dissolved solids to 130,000 parts per million (130 Kg/m³) total dissolved solids. It can be seen that the optimum capillary displacement is achieved in the salinity range of 60,000 to 110,000 ppm, with rapid fall off on either side of this range. This salinity range applies to this particular surfactant system only, however, and good performance can be obtained at higher or lower salinities by using dipolyethoxylated fatty amines having greater or smaller numbers of ethoxy groups per molecule. For example, the following general guideline illustrates how the optimum sample varies with total degree of ethoxylation.

TABLE III

| Salinity range ppm,tds | No. of EO groups for $C_8$ to $C_{18}$ fatty amine |
|---|---|
| 40,000–70,000 | 6–8 |
| 70,000–110,000 | 8–10 |
| 110,000–140,000 | 10–12 |

Thus, I have disclosed and demonstrated that the oil recovery efficiency is improved significantly in the use of a dual surfactant system employing at least one nonionic surfactant such as a dipolyethoxylated aliphatic amine or a dipolyethoxylated catechol, plus an anionic surfactant, if the degree of ethoxylation of the dipolyethoxylated nonionic surfactant is adjusted so that the nonionic surfactant's cloud point is from about 20° F. to about 80° F. greater than the temperature of the oil formation. While my invention has been described in terms of a number of illustrative embodiments, it is not so limited since many variations thereof will be apparent to persons skilled in the art of oil recovery by surfactant flooding without departing from the true spirit and scope of my invention. Similarly, while a mechanism has been proposed to explain the benefits resulting from the process of my invention, it is not intended hereby to be limited to any particular explanation of the mechanism involved in the process of my invention, but this mechanism is provided only for purposes of additional disclosure. It is my desire and intention that my invention be restricted and limited only by those restrictions and limitations contained in the claims appended hereinafter below.

I claim:

1. A method for recovering petroleum from a subterranean, permeable, petroleum-containing formation, which formation also contains water having a salinity from about 40,000 to about 140,000 parts per million total dissolved solids including from 3,000 to 12,000 parts per million polyvalent ions including calcium and magnesium, the temperature of said formation being from about 80° F. to about 180° F., said formation being penetrated by at least one injection well and by at least one production well, both wells being in fluid communication therewith, comprising (a) injecting into the formation via the injection well, an aqueous saline surfactant-containing fluid to displace petroleum through the formation toward the production well, said surfactant-containing fluid comprising:
(1) at least one primary anionic surfactant selected from the group consisting of petroleum sulfonate, alkyl sulfonates having from 8 to 25 carbon atoms, alkylaryl sulfonates having from 5 to 20 carbon atoms in the alkyl chain, and mixtures thereof;
(2) a dipolyethoxylated alkyl or alkylaryl amine nonionic surfactant having the following structure

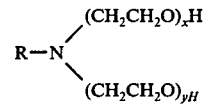

wherein R is an alkyl radical having from 6 to 25 carbon atoms, or an alkylaryl group having from 6 to 25 carbon atoms in the alkyl chain; and $x$ and $y$ are 1 to 12 and the sum of $x$ and $y$ is from 2 to 24, the total number of ethoxy groups per molecule of the nonionic surfactant being chosen so that the cloud point of the nonionic surfactant at the salinity of the formation water is from 20° F. to 80° F. greater than the temperature of the formation, the concentration of each of said anionic surfactant and said nonionic surfactant in the aqueous fluid being in the range from about 0.05 percent to about 5 percent by weight (b) recovering petroleum displaced by the surfactant containing fluid from the formation via the producing well.

2. A method as recited in claim 1 wherein the nonionic surfactant is a dipolyethoxylated fatty amine having from 8 to 20 carbon atoms.

3. A method as recited in claim 1 wherein the nonionic surfactant is a dipolyethoxylated alkyl amine having from 6 to 25 carbon atoms.

4. A method as recited in claim 1 wherein the nonionic surfactant is a dipolyethoxylated alkylaryl amine having from 6 to 22 carbon atoms in the alkyl chain.

5. A method for recovering petroleum from a subterranean petroleum-containing permeable formation, said formation also containing water having a salinity from about 40,000 to about 140,000 parts per million total dissolved solids and from 3,000 to 12,000 parts per million divalent ions including calcium and magnesium, the formation temperature being from 80° F. to 180° F., comprising:

(a) introducing into the formation a saline surfactant-containing aqueous fluid having about the same salinity as the formation water, and containing an organic sulfonate anionic surfactant selected from the group consisting of petroleum sulfonate, alkyl sulfonate containing from 8 to 25 carbon atoms, alkylaryl sulfonate having from 5 to 20 carbon atoms in the alkyl chain, and mixtures thereof, and a dipolyethoxylated nonionic surfactant having the following formula

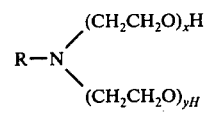

wherein R is an alkyl group having from 6 to 25 carbon atoms, or an alkylaryl group having from 6 to 25 carbon atoms in the alkyl chain, and $x$ and $y$ are numbers from 1 to 12 and the sum of $x$ and $y$ is from 2 to 24; the average total number of ethoxy groups per molecule of the nonionic surfactant being chosen so the cloud point of the nonionic surfactant at the salinity of the formation water is to be from 20° F. to 80° F. greater than the temperature of the formation; and (b) recovering petroleum displaced by the surfactant fluid from the formation.

6. A method as recited in claim 5 wherein the surfactant solution also contains an alkylpolyethoxy sulfate or sulfonate.

7. A method as recited in claim 5 wherein the surfactant solution also contains an alkylarylpolyethoxy sulfate or sulfonate.

* * * * *